Sept. 28, 1943.  W. W. ECKART  2,330,565
POWER TRANSMISSION PUMP
Filed Oct. 30, 1939  6 Sheets-Sheet 1

INVENTOR.
Walter W. Eckart
BY Glenn S. Noble
ATTORNEY.

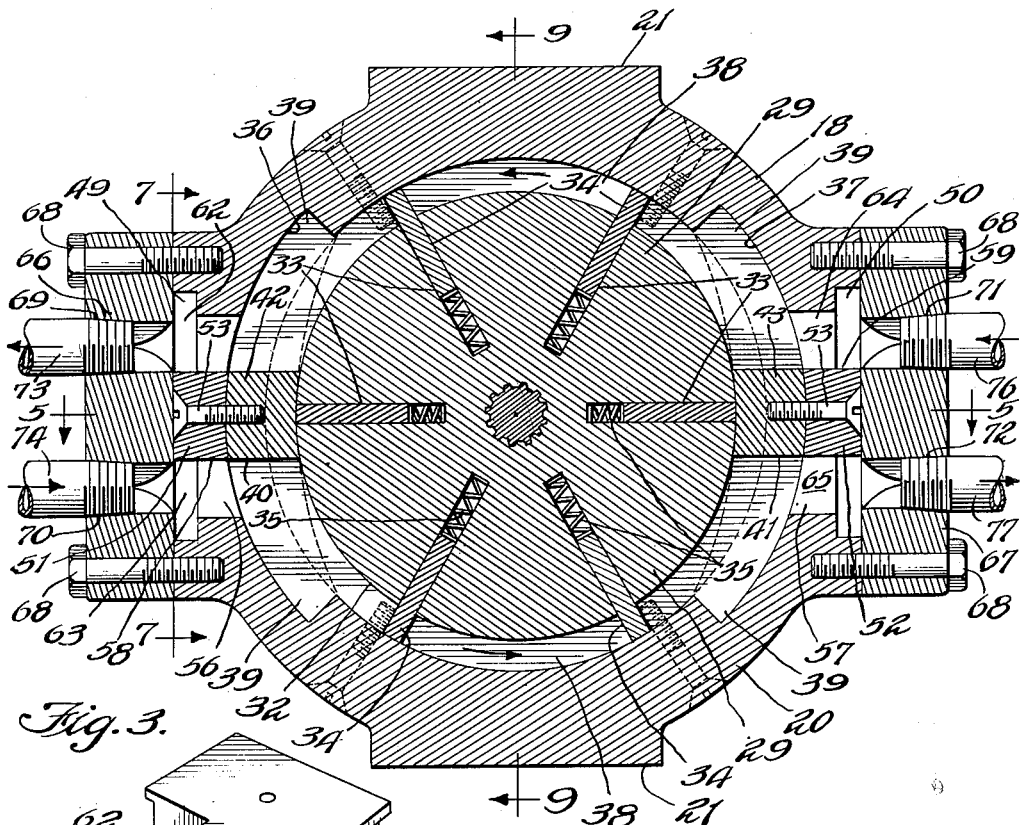
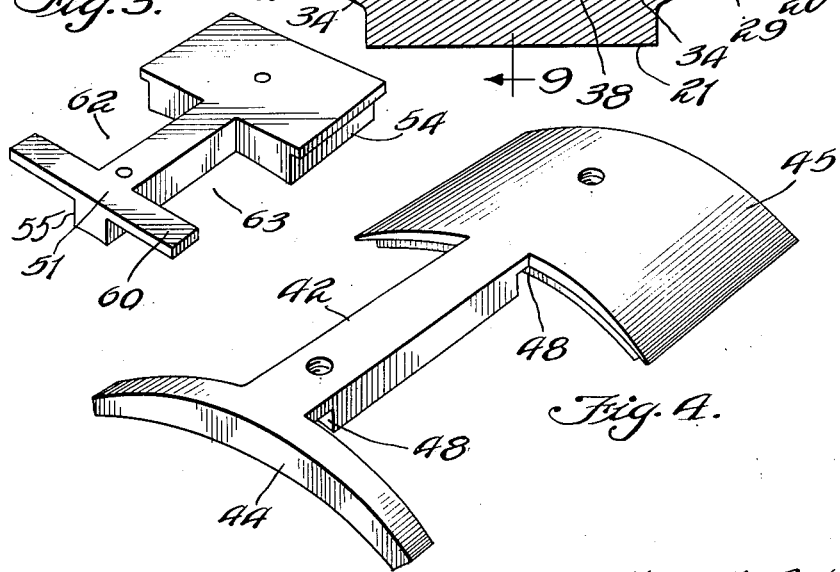

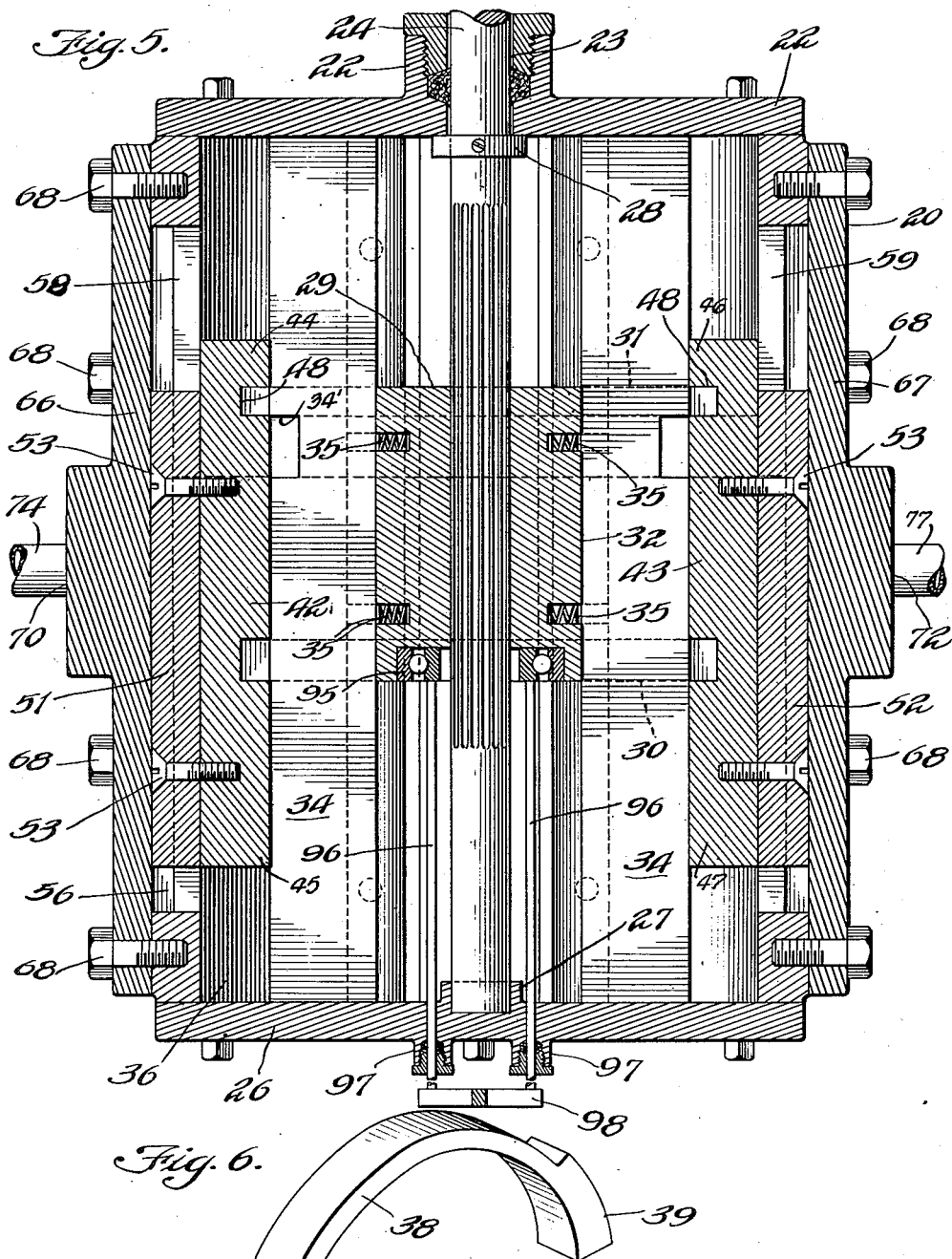

Sept. 28, 1943.   W. W. ECKART   2,330,565
POWER TRANSMISSION PUMP
Filed Oct. 30, 1939   6 Sheets-Sheet 4

INVENTOR.
Walter W. Eckart
BY Glenn S. Noble
ATTORNEY.

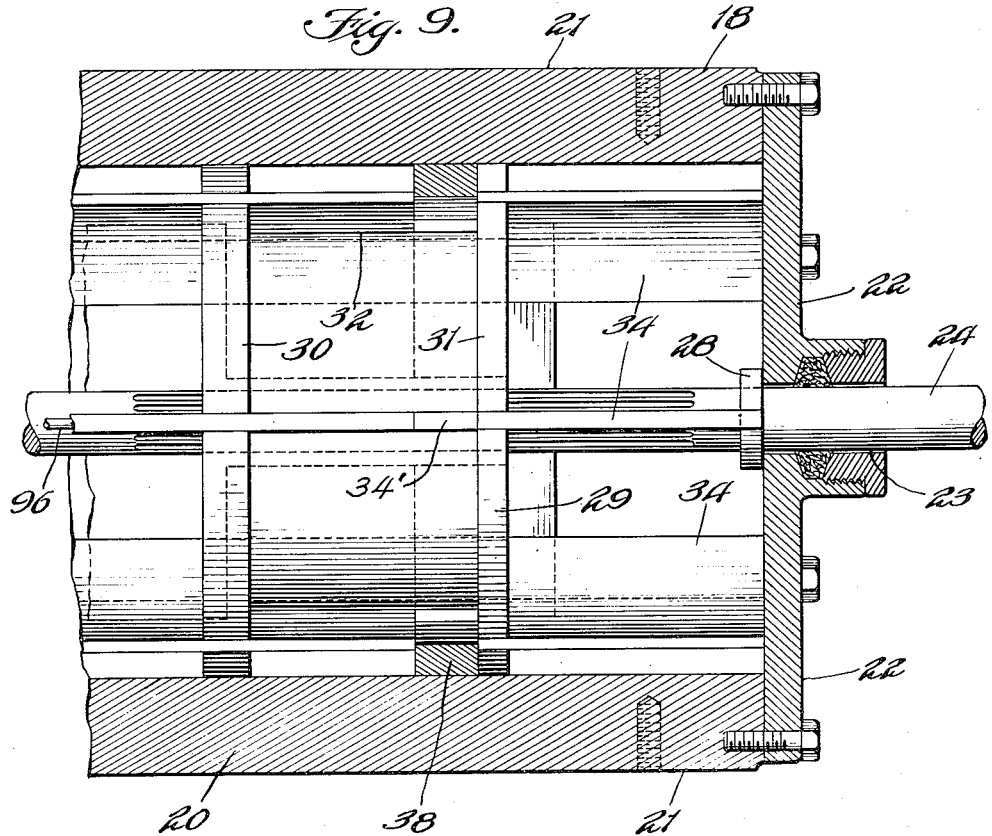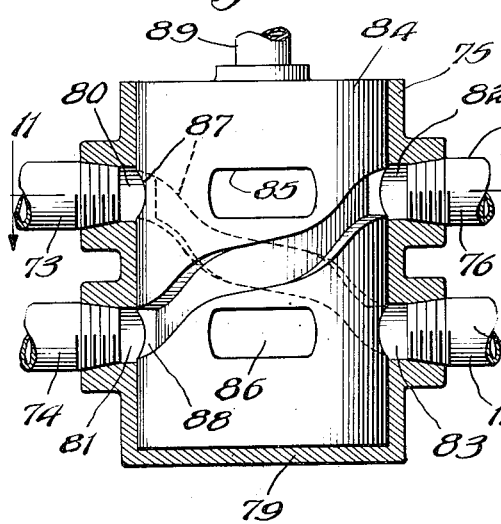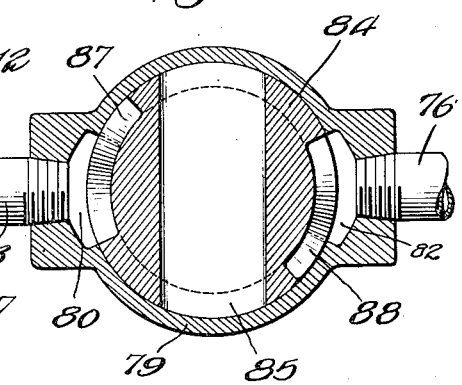

Sept. 28, 1943.  W. W. ECKART  2,330,565
POWER TRANSMISSION PUMP
Filed Oct. 30, 1939  6 Sheets-Sheet 6

INVENTOR.
Walter W. Eckart
BY Glenn S. Noble
ATTORNEY.

Patented Sept. 28, 1943

2,330,565

UNITED STATES PATENT OFFICE 2,330,565

POWER TRANSMISSION PUMP

Walter W. Eckart, Chicago, Ill.

Application October 30, 1939, Serial No. 302,003

7 Claims. (Cl. 103—120)

This invention relates generally to means for transmitting power from any suitable source to a part or unit or a plurality of units to be driven thereby and includes controlling mechanism and in some instances braking means as well as other means or instruments necessary or desirable to make a complete operating system. It is intended for general use such as transmitting power to machines to be driven to supplant the usual shafting pulleys, motors or the like commonly used for such purposes, and is especially adapted for driving motor vehicles, automobiles, trucks, tractors, or the like. My improved system will therefore be illustrated and described with special reference to such vehicles but without being limited thereto except as to certain instrumentalities necessary to the operation of such vehicles.

The objects of this invention are to provide an improved means or apparatus for transmitting and controlling power; to provide means for transmitting power from a power supply such as an engine or the like, to the parts to be driven, and for controlling the power to regulate the speed and torque of the driven parts; to provide a hydraulic power transmission which will be comparatively simple in construction and effective in operation; to provide an improved pump or driving unit and an improved motor or driven unit; and means for operatively connecting the same to provide a hydraulic system which will serve as a brake for one or more wheels or driven members; to provide an improved controlling valve for controlling the fluid passing from the pump to the motors; and to provide such other advantages and novel features as will be described more fully hereinafter.

In the accompanying drawings illustrating one form of this invention,

Figure 2 is a cross sectional view of the impeller or driving element;

Figures 3 and 4 are perspective views showing details of the impeller;

Figure 5 is a longitudinal sectional view of the impeller taken approximately on the line 5—5 of Figure 2;

Figure 6 is a perspective view of a dividing ring element;

Figure 9 is a longitudinal sectional view taken approximately on the line 9—9 of Figure 2 but showing some of the inner parts in full;

Figure 10 is a longitudinal sectional view of the controlling and reversing valve;

Figure 11 is a cross sectional view taken on the line 11—11 of Figure 10;

Figure 1:
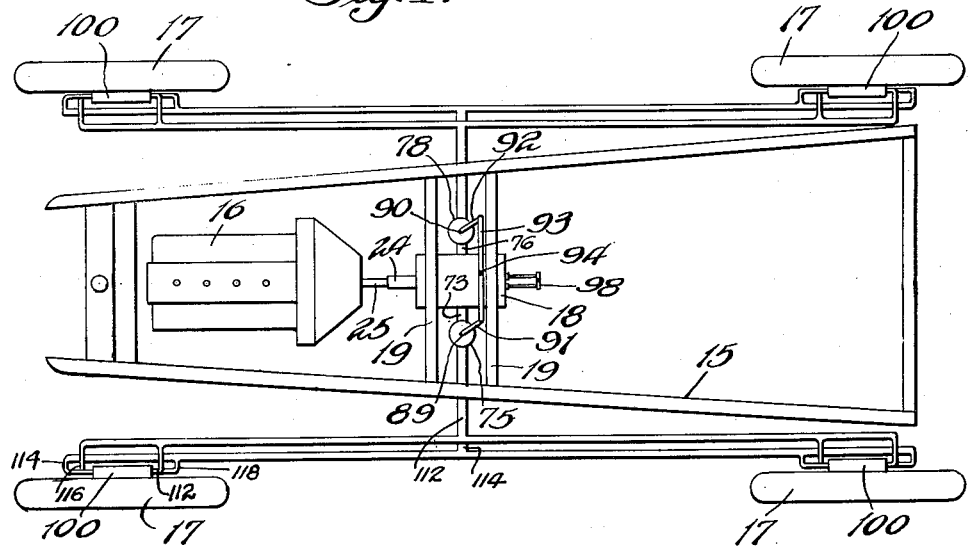
Figure 1 is a diagrammatic view of a motor vehicle equipped with my improved power transmission.

In the particular embodiment of the apparatus as shown in these drawings, 15 represents generally the chassis or framework of a motor vehicle having an engine or motor 16 and wheels 17, other controlling mechanisms and parts being omitted for convenience in illustration. The impeller or pump 18 is carried on cross bars or beams 19 being positioned adjacent to the engine so that it may be coupled directly therewith. The pump cylinder or housing 20 is preferably provided with pads or flattened at the top and bottom as shown at 21 for convenience in bolting or securing the same to the cross bars. The cylinder 20 has a head 22 at the front end which is provided with a bearing 23 for a shaft 24 which is connected to the engine shaft 25 and driven thereby. The opposite end of the cylinder is closed by a head 26, these heads being secured to the cylinder in any suitable manner as by cap screws or bolts, and is provided with a bearing 27 for the inner end of the shaft 24 as shown in Figure 5.

The collar 28 engages with the head 22 and prevents longitudinal movement of the shaft.

A rotor or rotary piston 29 is slidably mounted on the shaft 24 and is keyed or splined or otherwise attached to the shaft in order to partake of the rotary movement thereof. The rotor is considerably shorter than the cylinder 20 and has end portions 30 and 31 which fit closely within the cylinder, these being separated by an intermediate portion 32 of less diameter than the cylinder, thus leaving an annular space between the central portion of the rotor and the inner walls of the cylinder. The rotor is provided with a plurality of radial slots 33 for receiving vanes or blades 34 which are slidably mounted in the slots and are urged outwardly by means of springs 35 whereby their outer edges will tend to make close contact with the inner walls of the cylinder. These blades extend the full length of the cylinder, as shown in Figure 5, and are held against longitudinal movement by engaging with the heads 22 and 26 respectively.

Any number of these vanes or blades may be utilized but I prefer to use six, as shown.

Two oppositely disposed longitudinal recesses or guideways 36 and 37 are provided in the inner portion of the cylinder and extend the full length thereof. A fixed circumferential wall is formed by two segmental ring members or abutments 38 as shown in Figure 6 which are secured to the inner surface of the cylinder and which have lugs or projections 39 that extend into the guideways 36 and 37. The inner surfaces of these segments fit closely over the outer wall of the rotor 29. These circumferential wall members do not extend entirely around the rotor but leave longitudinal guideways 40 and 41 between their adjacent ends as shown in Figure 2. The blades 34 are notched as shown at 34', Fig. 5, to permit them to move outwardly beyond the inner surface of the member 38 upon passing the partition members 42 and 43 as they rotate past said members.

Longitudinally slidable blocks or partition members 42 and 43 fit in the guideways 40 and 41 and make close contact with the rotor and serve to define two oppositely disposed pressure chambers as will be explained hereinafter. These blocks are formed integrally with cam-like projections 44, 45 and 46, 47 on the ends of the respective blocks as shown in Figures 4 and 5. These cam members fit closely within the guideways 36 and 37 and are adapted to slide longitudinally therein. Slots or recesses 48 are provided at the ends of the blocks for receiving the flanges or end portions 30 and 31 of the rotor whereby the rotor may turn with respect to the block and cam members but will serve to slide said members longitudinally of the cylinder when the rotor is reciprocated.

Depressions or guideways 49 and 50 are formed on opposite sides of the cylinder to provide valve chambers for reciprocable valves 51 and 52 which are shaped as shown in Figure 3. The inner surfaces of these valves fit closely against the outer surfaces of the blocks and cam members as shown in Figure 2, and make tight joints therewith and the valves are secured to said block and cam members in any convenient manner as by bolts or screws 53 so that the valves will reciprocate with said members and with the rotor or piston 29. The end portions 54 and 55 of the valves extend through rectangular ports or openings 56 and 57 through the walls of the cylinder and the longitudinal stem portions extend through slots 58 and 59 forming extensions of said ports. The stem portions have transverse bars or projections 60 and 61 that fit closely in the guideways, thus forming inlet openings 62, 63 and 64, 65 in the respective valves on the opposite sides of the cylinder. The valve chambers are closed by cover plates 66 and 67, the inner surfaces of which fit closely against the valves and which are secured to the cylinder by means of bolts 68. The cover plates 66 and 67 are provided respectively with ports or holes 69, 70 and 71, 72 which may serve as inlet or outlet openings, dependent upon the direction of rotation of the rotor. Pipes 73 and 74 lead from the ports 69 and 70 to a control and reversing valve 75 as shown in Figures 1 and 10. Similar pipes 76 and 77 lead from the ports 71 and 72 to a similar valve 78. These valves are substantially the same so that it will only be necessary to describe one of them. It comprises a valve body 79 having ports or holes 80 and 81 on one side with which the pipes 73 and 74 are connected and oppositely disposed ports or holes 82 and 83 for other pipes which will presently be described.

The rotary valve 84 has a transverse hole 85 to provide communication from port 80 to port 82 when the valve is turned to proper position, and another transverse hole 86 to connect the ports 81 and 83. The valve also has a peripheral groove or passageway 87 which provides communication between the ports 80 and 83 when the valve is turned to the position shown in Figure 10 and has another peripheral groove 88 to provide communication from the port 80 to the port 82. The valves 75 and 78 are provided respectively with stems 89 and 90 which are connected by any suitable means for simultaneous operation. As shown in Figure 1 these stems have arms 91 and 92 which are connected by a link 93. This link is provided with a handle or operating rod 94 which may be used by the operater to adjust the valves or any suitable link and leverage arrangement, such as commonly used for automobile operation, may be provided for actuating the same.

Figure 14:
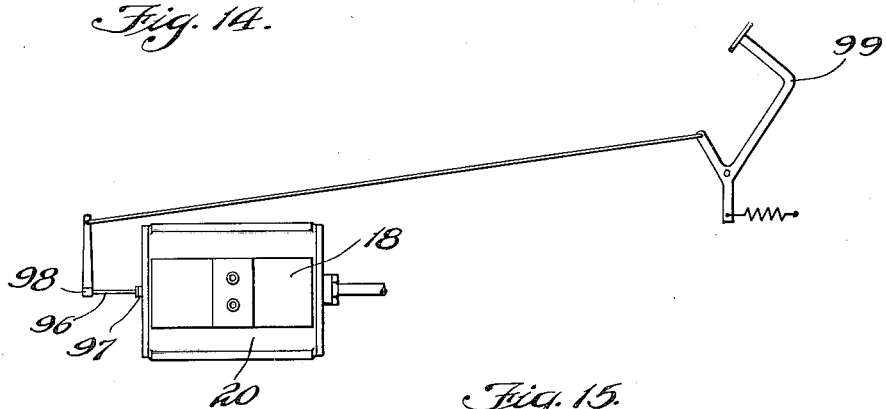
Figure 14 is a diagrammatic view of the pedal and connections for reciprocating the rotor.

The control or reciprocation of the rotor is preferably effected by manual control means actuated in a manner similar to the clutch pedal of an automobile. One portion or ring of a bearing 95 preferably of the thrust type is fixed in the end of the rotor as shown in Figure 5 and turns therewith. The other ring or relatively stationary portion of the bearing is secured to the ends of rods 96 which extend out through bearings 97 in the head 26. These rods are connected by a yoke or cross-piece 98 which may be connected with a pedal 99 as shown in Figure 14.

The pump or impeller 18 serves to drive any suitable fluid or liquid which may be used for transmitting the power. Pipes leading from the valves 75 and 78 may be connected with one or more motors or devices 100 to be driven by the fluid but in the present instance they are shown as being connected with motors for driving each of the four wheels 17 of the vehicle. Any suitable motors adapted for this purpose may be used but I prefer the construction shown in Figures 12 and 13.

Figures 12, 13:
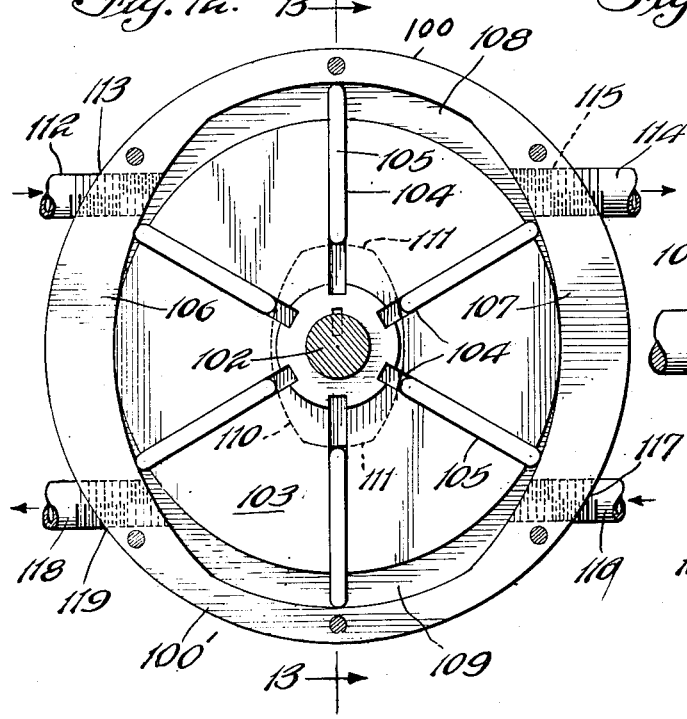
Figure 12 is a front view of the driven element or motor with the head removed.
Figure 13 is a cross sectional view taken on the line 13—13 of Figure 12.
Figure 7:
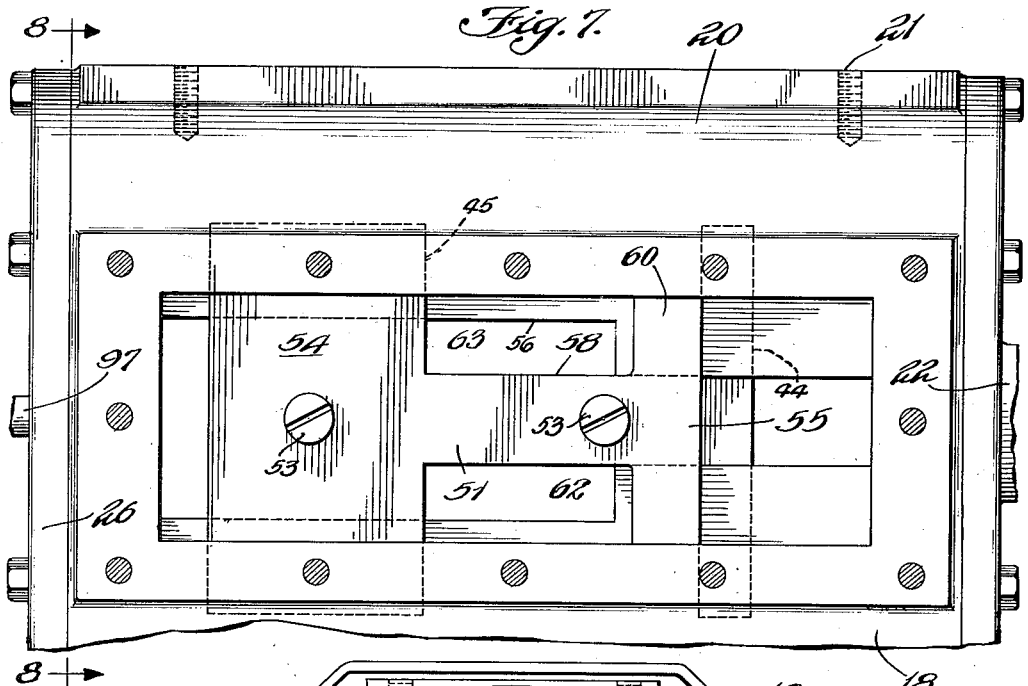
Figure 7 is a sectional view taken on the line 7—7 of Figure 2, showing a portion of the impeller cylinder or housing with one of the cover plates removed.
Figure 8:
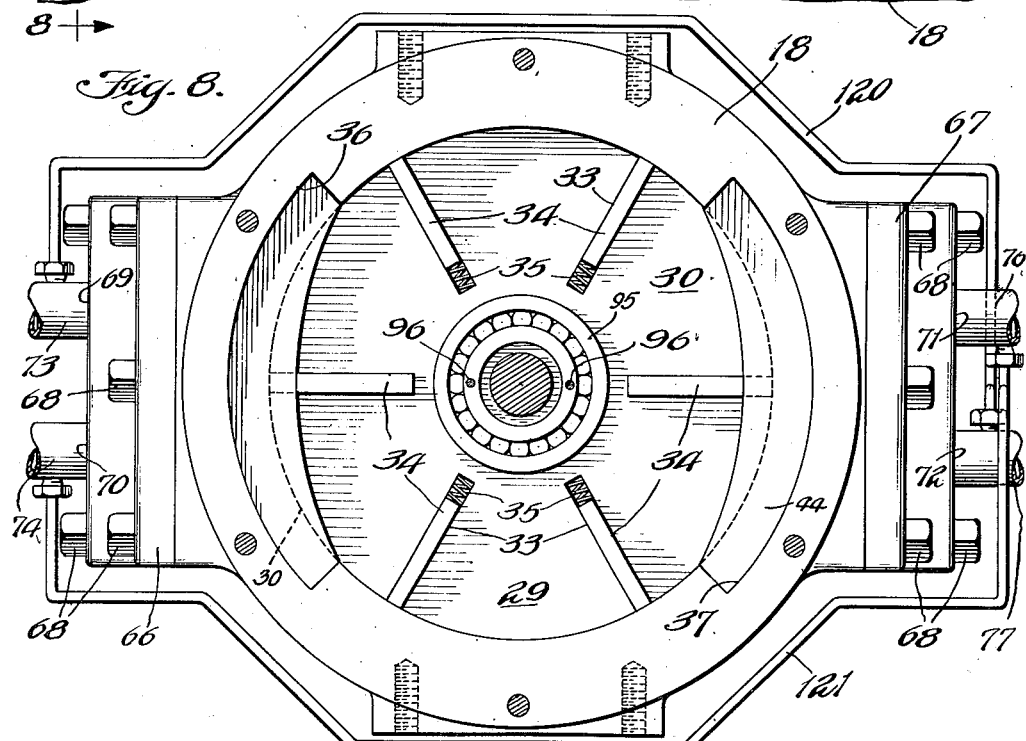
Figure 8 is a sectional view taken on the line 8—8 of Figure 7 showing an end view of the impeller with the head removed.

Each motor comprises a cylinder or housing 100' provided with bearings 101 for a driven shaft 102 which is connected with its respective road wheel. A driving wheel or rotor 103 is mounted in the cylinder and fixed to the shaft for turning the same. These wheels have radial slots 104 for driving blades 105 which are adapted to make close contact with the inner peripheral wall of the cylinder which is substantially circular throughout the main portion thereof. The walls on either side of the cylinder extend inwardly a sufficient distance to form abutments 106 and 107 as shown in Figure 12, which make close contact with the rotor 103 to form oppositely disposed chambers 108 and 109. A stationary cam 110 is fixed to one of the heads of the cylinder and has oppositely disposed sectors 111 which engage with the inner edges of the blades 105 to force them out against the adjacent circular portions of the cylinder walls. The cam has recessed portions on either side to permit the blades to move inwardly as they come in contact with the inner faces of the abutments 106 and 107, the arrangement being such that the blades will make tight running fit throughout the entire inner periphery of the cylinder. A conduit or pipe 112 leads from the port 82 of valve 75 to a port 113 leading into one side of the chamber 108. Another pipe 114 leads from the port 83 to a port 115 in the chamber 108, these ports being on either sides of the chamber 108. A pipe 116 leads from a port 117 at the opposite side of chamber 109 to the pipe 112 and forms a branch or by-pass from said pipe to port 117. Another pipe 118 leads from a port 119 at one side of chamber 109 and connects with pipe 114, thus making a branch or by-pass connection.

Figure 15:
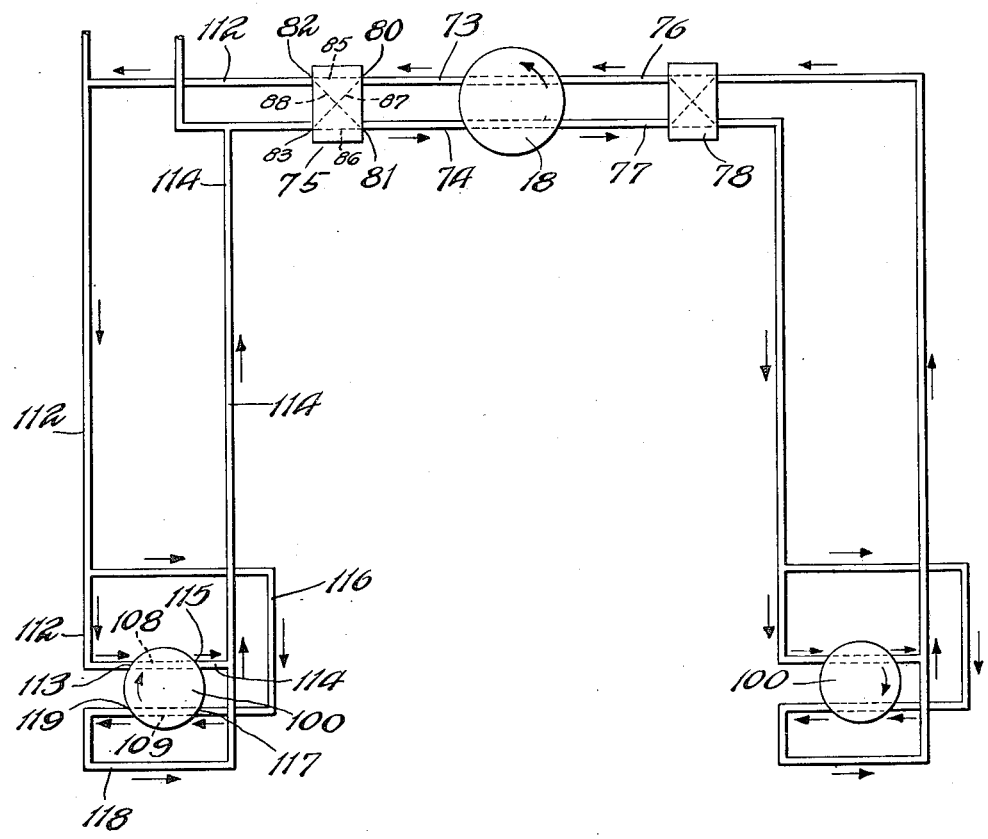
Figure 15 is a diagrammatic view showing the travel or circuit of the fluid from the pump or impeller to the respective wheel motors.

As shown particularly in Figure 15, the fluid passes from the pump or impeller 18 through pipe 73, valve 75, pipes 112 and 116 to one of the motors, as for instance a motor 100 on the left hand side of the vehicle, and enters the proper sides of the chambers 108 and 109 to drive the rotor in one direction. The return is from these chambers through pipes 114 and 118, valve 75 and pipe 74 to the opposite side of the pump and the ports on this side of the pump are connected through similar piping to the motors on the opposite or right hand side of the vehicle as indicated and makes a complete circuit for the fluid. Of course the pipes may be connected with any number of wheels on each side of the vehicle as desired. This also indicates the method in which the system may be used for driving motors for other purposes as for driving machines and the like.

As shown in the diagram Figure 15, the fluid passes directly through the straight ports 85 and 86 of the valve 75. If it is desired to reverse the direction of the vehicle or rotation of the driven motors the valves 75 and 78 are rotated to connect the cross or diagonal passageways with the respective ports, which causes the fluid to flow in a reverse direction through the motors although being driven in the same direction by the pump. The two valves are interconnected as shown by the link 93 and have means for manual operation so that they will be turned at the same time. In order to provide for the differential movement of the vehicle wheels in turning I connect the opposite sides of the system as for instance pipes 73 and 77 and pipes 74 and 76 with small bleeder pipes or connections 120 and 121 respectively so that there will be just sufficient leakage to permit one wheel to run ahead of the other.

The impeller or pump 18 may be driven in either direction so that the respective ports become either intake or outlet ports, depending upon the direction of rotation. For instance as shown in Figure 2, with the rotor 29 turning in the direction indicated by the arrow fluid will be drawn in through passageways or ports 63 and 64 of the valves 51 and 52 respectively and will be driven out by the action of the blades through the passageways or ports 62 and 65 on the opposite sides of the respective valves. This arrangement is such that the strains on the pump are all substantially balanced and obviates undue pressure or wear on the bearings as well as providing for a smooth operation.

The output or power delivered by the pump is regulated by the longitudinal movement of the rotor 29 which is manually effected by the mechanism heretofore described, this operation being somewhat analogous to the operation of the clutch of an ordinary motor vehicle. It will be noted that the effective chamber areas or spaces of the rotor 29 are between the fixed dividing wall formed by the ring members 38 and the head or end portions 30 and 31 of the rotor 29, as perhaps best seen from Figures 5 and 9. When the piston or rotor is moved longitudinally, the space between these members is varied so that it may be increased or decreased and thus control the amount of fluid passing through the pump. Furthermore the valves 51 and 52, being fixed so that they slide with the rotor simultaneously, tend to cut off the supply or size of the inlet ports and the output or size of the outlet ports as the case may be. When these valves reach one extreme of their movement the ports will be finally closed and will prevent any fluid from passing to or from the pump. This provides effective braking means for controlling or stopping the vehicle as, when such ports are closed the respective motors will tend to force the fluid through the pump but on account of the closed valves back pressure will be caused, thus tending to stop the wheels.

The operation is such that the prime mover can start or continue running without interference of or with the compressor.

I have shown and described a motor embodying my improved power transmission but it is understood that the vehicle may be provided with the usual mechanisms or devices to make the same operative and it will also be understood that the several devices shown and described herein may be modified for other uses without departing from the scope of the invention. Therefore I do not wish to be limited to the particular mechanisms or combinations herein shown and described except as specified in the following claims, in which I claim:

1. In a rotary pump or impeller, the combination of a cylinder, a rotor slidably mounted in the cylinder in axial alignment therewith and movable longitudinally of the cylinder, manually operable means for adjusting the rotor longitudinally of the cylinder, impeller blades radially mounted in the rotor and coacting with the cylinder, springs pressing the blades against the inner surface of the cylinder, said rotor having a reduced central portion with radial outwardly extending flanges at the ends thereof which fit closely within the cylinder, blocks slidably mounted in the cylinder and slidable longitudinally thereof and projecting into the space between the flanges of the rotor and adapted to be moved longitudinally by the longitudinal movement of the rotor, said blocks serving to divide the space between the rotor and the cylinder into two oppositely disposed chambers, projections on the blocks forming cams which engage with the blades to depress the same and permit them to pass the blocks, a circumferential dividing wall fixed in the cylinder extending from one block to another and projecting into the space between the flanges of said rotor and fitting closely against the rotor and the blocks, inlet and outlet openings through the cylinder on each side of the respective blocks, valves mounted in the cylinder and secured to said blocks for opening and closing said openings, and means for turning said rotor.

2. In an apparatus of the character set forth, the combination of a cylinder having guideways in the inner wall thereof which are disposed on opposite sides of the cylinder and extend longitudinally thereof, partition members slidably mounted in said guideways having radially inwardly extending abutments in the central portions thereof which extend longitudinally thereof, and inwardly extending cam portions at the ends thereof, a shaft mounted in the cylinder, a rotor slidably mounted on the shaft to slide longitudinally thereof and driven thereby and having a reduced central portion and projecting flanges which make a close fit in the cylinder, said central portion fitting between the inner surfaces of the partition members and the flanges engaging with the ends thereof whereby the partition members will be moved longitudinally with the rotor, a circumferential dividing wall fixed in the cylinder and projecting into the space between said flanges and having a tight engagement with the reduced portion of the rotor and with said partition members, said cylinder having pressure chambers on each side of said dividing wall, radial slots in the rotor, impeller blades mounted in said slots and having notches for receiving said wall, means tending to urge the blades against the cylinder, inlet and outlet openings on each side of the respective partition members leading to the respective chambers in the cylinder, valves slidably mounted in the cylinder and connected with said partition members for opening and closing said openings, and means for adjusting the rotor longitudinally of the shaft.

3. A rotary pump or impeller having a casing with a cylindrical bore, a rotor mounted in the casing and having impeller blades coacting therewith, a compression chamber between the rotor and the casing, one end of said chamber being formed by an annular projection on the rotor and the other end formed by an abutment in the casing, the rotor being longitudinally movable with respect to the casing to vary the size of the chamber, means for moving the rotor longitudinally of the casing, a driving shaft having slidable connection with the rotor, inlet and outlet ports and valves coacting with the rotor for opening and closing the ports as the rotor is reciprocated.

4. In a device of the character set forth, the combination of a cylinder, a rotor slidably mounted in the cylinder, impeller blades slidably mounted in substantially radial slots in the rotor and adapted to coact with the rotor and the cylinder, said cylinder and rotor providing walls for a compression chamber, one end of said chamber comprising an annular projection on the rotor and the other end comprising an abutment in the cylinder, means for moving the rotor longitudinally of the cylinder for adjusting the size of the chamber, a shaft mounted in the cylinder and supporting the rotor, means for slidably connecting the rotor with the shaft to permit the rotor to move longitudinally of the shaft and to be driven thereby, inlet and outlet ports leading to the chamber, valves for opening and closing said ports, and means operable by the sliding movement of the rotor for actuating said valves.

5. In a rotary apparatus of the character set forth, the combination of a cylinder, a shaft axially mounted in the cylinder, a rotor slidably mounted on the shaft, manually operable means for adjusting the rotor longitudinally of the shaft, blades radially mounted in the rotor and coacting with the cylinder, spring means tending to press the blades outwardly against the cylinder, said rotor having outwardly extending flanges at the ends thereof which fit closely within the cylinder, blocks mounted in the cylinder and adapted to slide longitudinally thereof and projecting into the space between the flanges of the rotor and moved by the longitudinal movement of the rotor, said blocks dividing the space between the rotor and the cylinder into two oppositely disposed chambers, cam projections on the blocks which engage with the blades to depress the same and permit them to pass the blocks when the rotor is rotated, a circumferential dividing wall fixed in the cylinder extending from one block to another and projecting into the space between the flanges of the rotor and fitting closely against the rotor and the blocks, inlet and outlet openings through the cylinder on each side of the respective blocks, valves mounted in the cylinder for opening and closing said openings, means for connecting the blocks and valves whereby the valves will be actuated by the blocks, and means for turning said shaft.

6. In combination, a cylinder having longitudinal guideways disposed on opposite sides of the inner wall thereof, partition members slidably mounted in said guideways and having inwardly extending longitudinal abutments in the central portions thereof and inwardly extending cams at the ends thereof, a shaft rotatably mounted in the cylinder, a rotor slidably mounted on the shaft and driven thereby and having a reduced central portion and projecting flanges at the ends thereof fitting closely in the cylinder, said central portion engaging with the inner surfaces of the partition members and the flanges engaging with the ends of the partition members whereby the partition members will be moved longitudinally with the rotor, a circumferential wall fixed in the cylinder and projecting into the space between said flanges and having a tight engagement with the reduced portion of the rotor and with said partition members, said cylinder having chambers on each side of said circumferential wall, radial slots in the rotor, impeller blades mounted in said slots and having notches for engagement with said wall, resilient means for urging the blades outwardly against the cylinder, inlet and outlet openings on each side of the respective partition members leading to the respective chambers in the cylinder, valves slidably mounted in the cylinder, means for connecting the valves with the partition members whereby the valves will be actuated by said members for opening and closing said openings, means for adjusting the rotor longitudinally of the shaft, and means for turning the shaft.

7. A rotary pump including a cylinder having compression chambers disposed on opposite sides thereof, said cylinder having inlet and outlet means for said compression chambers, a rotor mounted to slide longitudinally in the cylinder, manually operable means for sliding the rotor in the cylinder, means for turning the rotor, impeller blades radially slidably mounted in radial slots in the rotor and engaging with the inner walls of the cylinder for drawing fluid into the chambers and discharging it therefrom, means fixed in the cylinder adapted to coact with the rotor for varying the sizes of the chambers when the rotor is moved longitudinally of the cylinder, and means for holding the blades against longitudinal movement with respect to the cylinder whereby they will slide in the slots in the rotor when the rotor is moved longitudinally with respect to the cylinder.

WALTER W. ECKART.